United States Patent Office 3,419,482

Patented Dec. 31, 1968

3,419,482

ELECTROLYTIC METHOD FOR PREPARING POLYAMIDES

Heinrich Gilch, Krefeld, Germany, assignor to Farbenfabriken Bayer Aktiengesellschaft, Leverkusen, Germany, a corporation of Germany No Drawing. Filed Feb. 24, 1966, Ser. No. 529,629
Claims priority, application Germany, Mar. 26, 1965
F 45,648
8 Claims. (Cl. 204—62)

This invention relates to a process for the preparation of polyamides by electrolytic polymerization of lactams. It is known to polymerize lactams in the presence of catalysts to form polyamides. From these polyamides coating can be produced on solid bodies by classical processes, i.e. from solution or from the melt. These processes, as well as the process of sintering in a fluidized bed, are unsatisfactory from the economical and technical point of view.

The technologically important polyamides such as polycaprolactam and the polyamide of hexamethylene diamine and adipic acid dissolve only in a few high boiling or corrosive solvents such as formic acid and cresols, which for practical purposes are out of the question. Although copolymers have satisfactory solubility properties in numerous simple solvents, they are inferior to homopolymers in many respects in their physical properties such as hardness, tensile strength and softening point. Since the solids content of the solutions is usually not greater than 25% due to the steep upward slope of the viscosity concentration curve, only relatively thin films can in this way be produced in one application.

The production of coatings from the melt also has numerous disadvantages. The poor thermol conductivity of polyamides and their sensitivity to water and oxygen necessitate complicated apparatus for melting. Due to the considerable contraction of polyamide melts on cooling crystallization, tensions occur between the coating and the support. Similar disadvantages, apart from the expenditure in apparatus, are also found in the so-called flame spraying process. The pulverulent polyamides required for this process have to be obtained by complicated and time-consuming methods such as precipitation in water or grinding up at very low temperatures. It is therefore obvious that technical advantages are to be expected from a direct conversion of the readily accessible lactams into polyamides coatings.

It has now been found that when molten lactams are electrolysed in the presence of an alkali metal salt and a co-catalyst a film of the corresponding polyamide is formed on the cathode, the amount of the alkali metal salt being in the range of 0.01% to 10% and the amount of the catalyst in the range of 0.01% to 10% based on the lactam. Electrical conductors can in this way be coated with polyamide if they are connected into a circuit as cathodes.

Lactams having at least 7 ring members, such as caprolactam, caprylladam, and lauroyllactam can be polymerized by this process. Copolymers can also be prepared.

An alkali metal salt, e.g. inorganic salts such as sodium chloride, potassium chloride or organic salts such as sodium benzoate or alkali salts of alkyl substituted benzenesulfonic acids are suitable for use as electrolytes. As co-catalysts there may be used the known accelerators in ionic polymerization of lactams, such as isocyanates and acylated lactams. Since the conductivity increases with increasing electrolyte concentration, it is preferable to use salts which have a high solubility in molten lactams. Electrolysis becomes particularly simple if the salts used are such that the anion which they discharge on electrolysis does not yield products which undergo reaction with lactam to form compounds which could interfere with the process. Suitable salts are salts of organic acids, e.g. sodium benzoate. If electrolysis is carried out in the presence of such salts, there is no need to separate the anode chamber. If, however, halides such as sodium chloride or potassium chloride are used, for example, it is advantageous to separate the anode chamber from the cathode chamber by a ceramic diaphragm.

As co-catalysts there are used compounds customarily employed for accelerating ionic polymerization, such as alkyl- or aryl-, mono- or polyisocyanates, e.g., stearyl isocyanate, hexamethylene - 1,6 - diisocyanate, phenylene-1,4 - diisocyanate or acylated lactams such as N - acetyl lactam.

The current densities are not critical, but a current density of 1 to 10 ma./cm.$^2$ is usually employed. Good results are obtained if the cathode is tempered for some time without current flowing through it after it is used. Polyamide coatings however can be produced without this after tempering.

If neutral salts are used as electrolytes, the temperature at which electrolysis is carried out is not critical. The experiments are generally carried out between 130 and 270° C. In the case of weak basic electrolytes, certain temperatures must not be exceeded because otherwise the lactam will be polymerized even without contact with the cathode.

Any suitable electrical conductor may be used as cathode, e.g., graphite, iron, copper, zinc or aluminium, provided it is stable under the experimental conditions. One may also use non-connductors covered with a conductive coating. If electrolytes which form corrosive substances during anodic discharge are used, e.g., chlorides, carbon anodes are employed.

The films formed by this process have good mechanical properties and the coatings are firmly attached. Tensions arising between film and underlying surface due to the strong contraction of polyamide melts on cooling can be prevented by carrying out the electrolysis below the melting point of the crystalline constituents of the polymer.

When the solution viscosity of the polymers was determined in m-cresol, viscosity values of 4.5 to 8.0 were measured (measured in a 1% solution of m-cresol at 25° C.).

Example 1

A mixture of 220 g. of caprolactam and 0.2 g. sodium benzoate is heated in a three-necked flask equipped with two iron electrodes. To remove traces of water in the lactam, 18 g. of lactam were distilled off the clear melt at 10 mm. Hg. 1 g. hexamethylene-1,6-diisocyanate is then added under an atmosphere of nitrogen and the melt heated to 160° C. A voltage of 120 v. is applied between two electrodes immersed in the melt thus producing a current of 20 ma. The current is cut off after 60 seconds (cathode surface 9.62 cm.$^2$, current density 2.08 ma./cm.$^2$). After tempering for a further 120 seconds, the cathode is removed from the melt. The cathode is coated with a polyamide film of a total weight of 0.349 g. Relative solution viscosity of the polyamide: $\eta_R=7$.

Example 2

The experiment of Example 1 is modified as follows: Potassium chloride is used instead of sodium benzoate. The anode and cathode are separated by a diaphragm and a carbon electrode is used as anode. The temperature of electrolysis is raised to 200° C. Electrolysis is carried out for 40 seconds at a current intensity of 10 ma. (electrode surface 12.1 cm.$^2$, current density 0.83 ma./cm.$^2$.) Weight of the film 0.241 g. $\eta_R=8$.

Example 3

The same apparatus is used as in Example 1. A mixture of 120 g. caprolactam, 80 g. lauroyl lactam and 0.2 g. sodium benzoate is dehydrated by distilling off 20 g. caprolactam, and after the addition of 1 g. hexamethylene-1.6-diisocyanate it is electrolysed at 175° C. A current of 20 ma. is passed through the solution for 60 seconds and this is followed by tempering for 120 seconds at 175° C. (cathode surface 12.6 cm.$^2$, current density 1.59 ma./cm.$^2$), weight of film 0.695 g. $\eta_R=6.0$.

What I claim is:

1. A method for preparing synthetic linear polyamides which comprises polymerizing a lactam having at least seven ring members or mixtures thereof at the cathode of an eletcrolytic cell in the presence of an alkali metal salt and a co-catalyst at temperatures of between 130° C. to about 270° C.

2. The method of claim 1, wherein said cathode used is an article which is to be coated with polyamide.

3. The method of claim 1, wherein said lactam is ϵ-caprolactam.

4. The method of claim 1, wherein said mixture of lactams is a mixture of ϵ-caprolactam and laurinlactam.

5. The method of claim 1, wherein said alkali metal salt is sodium benzoate.

6. The method of claim 1, wherein said alkali metal salt is potassium chloride.

7. The method of claim 1, wherein said co-catalyst is hexamethylene-1,6-diisocyanate.

8. Formed articles coated with a synthetic linear polyamide by electrolytic polymerisation of a molten lactam having at least seven ring members or mixtures thereof in the presense of an alkali metal salt and a co-catalyst.

References Cited

UNITED STATES PATENTS 2,961,384 11/1960 Scroggs et al. ---- 204—59 XR
3,335,075 8/1967 Borman ------------ 204—59

JOHN H. MACK, *Primary Examiner.*

D. R. VALENTINE, *Assistant Examiner.*

U.S. Cl. X.R.

204—39, 59